United States Patent
Havanto et al.

(10) Patent No.: US 9,671,775 B2
(45) Date of Patent: Jun. 6, 2017

(54) ACTUATOR ASSEMBLY

(71) Applicant: ABB Oy, Helsinki (FI)

(72) Inventors: Petri Havanto, Espoo (FI); Mikko Ristolainen, Espoo (FI); Juhana Jaatinen, Espoo (FI)

(73) Assignee: ABB Technology OY, Helsinki (FI)

( * ) Notice: Subject to any disclaimer, the term of this patent is extended or adjusted under 35 U.S.C. 154(b) by 371 days.

(21) Appl. No.: 14/337,558

(22) Filed: Jul. 22, 2014

(65) Prior Publication Data

US 2015/0045957 A1    Feb. 12, 2015

(30) Foreign Application Priority Data

Aug. 6, 2013  (EP) .................................... 13179401

(51) Int. Cl.
*G06F 19/00*   (2011.01)
*G05B 19/4062*   (2006.01)

(52) U.S. Cl.
CPC ............... *G05B 19/4062* (2013.01); *G05B 2219/42269* (2013.01); *G05B 2219/42308* (2013.01); *G05B 2219/42329* (2013.01)

(58) Field of Classification Search
CPC .............. G05B 19/4062; G05B 19/406; G05B 2219/42269; G05B 2219/42329; G05B 2219/42308
See application file for complete search history.

(56) References Cited

U.S. PATENT DOCUMENTS

| 3,340,710 A * | 9/1967 | O'Brien | E05B 43/005 70/271 |
| 4,740,134 A * | 4/1988 | Dixon | B65G 47/904 198/468.2 |
| 4,965,502 A | 10/1990 | Ogasawara | |
| 2013/0150985 A1* | 6/2013 | Ohkado | G06F 21/552 700/79 |
| 2016/0249436 A1* | 8/2016 | Inskeep | H05B 37/0227 |

OTHER PUBLICATIONS

Scilingo, Enzo Pasquale, Antonio Lanata, and Alessandro Tognetti. "Sensors for wearable systems." Wearable Monitoring Systems. Springer US, 2011. pp. 3-25.*
Eddy, David S., and Douglas R. Sparks. "Application of MEMS technology in automotive sensors and actuators." Proceedings of the IEEE 86.8 (1998): 1747-1755.*
European Search Report issued on Nov. 25, 2013.

* cited by examiner

*Primary Examiner* — Michael D Masinick
(74) *Attorney, Agent, or Firm* — Taft Stettinius & Hollister LLP

(57) ABSTRACT

An actuator assembly is disclosed, which includes a power unit, an actuator powered by the power unit, the power unit being configured to provide a work motion of the actuator, a motion sensor, a timing unit for measuring an immobility time of the actuator, a safety unit for selectively placing the actuator assembly into an operational state and a safety state in which the work motion of the actuator can be prevented, the safety unit being configured to prevent the operational state of the actuator assembly in case the immobility time of the actuator exceeds a predetermined process safety time. The actuator assembly can include an activation unit configured to control the power unit to provide an activation motion of the actuator in case the immobility time exceeds a predetermined activation time.

14 Claims, 1 Drawing Sheet

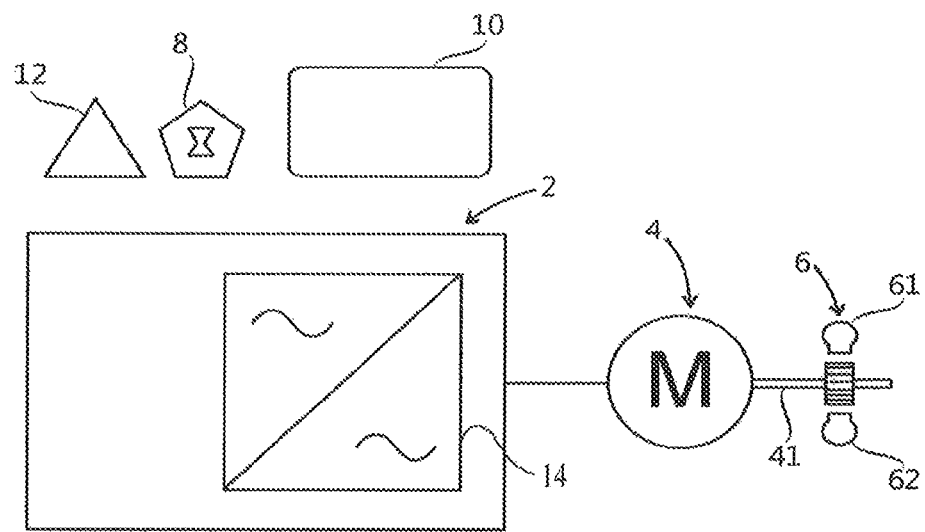

ACTUATOR ASSEMBLY

RELATED APPLICATION(S)

This application claims priority under 35 U.S.C. §119 to European Patent Application No. 13179401.8 filed in Europe on Aug. 6, 2013, the entire content of which is hereby incorporated by reference in its entirety.

FIELD

The disclosure relates to an actuator assembly.

BACKGROUND INFORMATION

If an actuator of a known actuator assembly is motionless for an extended period of time during an operational state of the actuator assembly, the actuator assembly can transfer to a safety state in which a working motion of the actuator can be prevented. The transition to the safety state can result from requirements for Safety Integrity Level (SIL). Transferring from the safety state back to an operational state in which the working motion of the actuator are allowed can take time and delay the start of the actuator assembly.

SUMMARY

An actuator assembly is disclosed, comprising: a power unit; an actuator powered by the power unit, the power unit being configured to provide a work motion of the actuator; a motion sensor configured to monitor motion of the actuator, the motion sensor including at least one motion sensor unit, the motion sensor being arranged to provide motion sensor signals in response to motion of the actuator; a timing unit for receiving the motion sensor signals and measuring an immobility time of the actuator based on the motion sensor signals, the immobility time of the actuator representing time lapsed after previous motion of the actuator; a safety unit for selectively placing the actuator assembly into an operational state in which the work motion of the actuator is allowed, and a safety state in which the work motion of the actuator is prevented, the safety unit being configured to monitor immobility time of the actuator and to prevent the operational state of the actuator assembly in case the immobility time of the actuator exceeds a predetermined process safety time; and an activation unit configured to monitor an immobility time of the actuator during an operational state of the actuator assembly, and to control the power unit to provide an activation motion of the actuator when the immobility time exceeds a predetermined activation time, the predetermined activation time being shorter than or equal to the predetermined process safety time, the activation motion being detectable by the motion sensor.

An actuator assembly is disclosed, comprising: a power means; an actuator powered by the power means, the power means being configured to provide a work motion of the actuator; a motion sensor means for monitoring motion of the actuator, the motion sensor means having at least one motion sensor unit, the motion sensor means being arranged to provide motion sensor signals in response to motion of the actuator; a timing means for receiving the motion sensor signals and measuring an immobility time of the actuator based on the motion sensor signals, the immobility time of the actuator representing time lapsed after previous motion of the actuator; a safety means for selectively placing the actuator assembly into an operational state in which the work motion of the actuator is allowed, and a safety state in which the work motion of the actuator is prevented, the safety means being configured to monitor immobility time of the actuator and to prevent the operational state of the actuator assembly in case the immobility time of the actuator exceeds a predetermined process safety time; and an activation means configured to monitor an immobility time of the actuator during an operational state of the actuator assembly, and to control the power means to provide an activation motion of the actuator in case the immobility time exceeds a predetermined activation time, the activation time being shorter than or equal to the predetermined process safety time, the activation motion being selected based on motion sufficient for detection by the motion sensor means.

BRIEF DESCRIPTION OF THE DRAWINGS

The subject matter of the disclosure will be explained in more detail in the following text with reference to exemplary embodiments, which are illustrated in the attached drawing, in which:

FIG. 1 shows an exemplary actuator assembly in accordance with an exemplary embodiment.

DETAILED DESCRIPTION

The present disclosure relates to an actuator assembly with an activation means, for example, an activation unit, adapted (i.e., configured) to monitor an immobility time of the actuator during an operational state of the actuator assembly, and in case the immobility time exceeds a predetermined activation time to control a power means, for example, a power unit, to provide an activation motion of the actuator, the activation time being shorter than or equal to a process safety time, and wherein the activation motion is a small motion, which can be large enough to be detected by a motion sensor means, for example, a motion sensor.

In accordance with an exemplary embodiment, the actuator assembly can remain in an operational state regardless of work motion of the actuator and fulfil needs for desired Safety Integrity Level.

The actuator assembly of FIG. 1 can include a power means 2, an actuator 4, a motion sensor means 6, timing means 8, safety means 10 and activation means 12. In accordance with an exemplary embodiment, the actuator 4 can be powered by the power means 2. The power means 2, for example, a power unit, can be adapted to provide a work motion of the actuator 4. The motion sensor means 6, for example, a motion sensor, can be adapted for monitoring motion of the actuator 4. The motion sensor means 6 can include motion sensor units 61 and 62. The motion sensor means 6 can be adapted to provide motion sensor signals in response to motion of the actuator 4. The timing means 8, for example, a timing unit, can be adapted for receiving the motion sensor signals and measuring an immobility time of the actuator 4 based on the motion sensor signals, the immobility time of the actuator representing time lapsed after previous motion of the actuator 4. The safety means 10, for example, a safety unit, can be adapted for selectively controlling the actuator assembly into an operational state in which the work motion of the actuator 4 can be allowed and a safety state in which the work motion of the actuator 4 can be prevented. The safety means 10 can also be adapted to monitor the immobility time of the actuator and can prevent the operational state of the actuator assembly in case the immobility time of the actuator exceeds a predetermined process safety time.

In an exemplary embodiment, the timing means 8, for example, a timing unit, can measure the immobility time of the actuator by measuring a length of a period during which signals from the motion sensor means can be unchanged.

The activation means 12, for example, an activation unit, can be adapted to monitor an immobility time of the actuator during an operational state of the actuator assembly, and to control the power means 2 to provide an activation motion of the actuator 4 in case the immobility time exceeds a predetermined activation time. Depending on the embodiment, the activation means can be adapted to monitor an immobility time of the actuator only during an operational state of the actuator assembly or always when the activation means is on. In accordance with an exemplary embodiment, the activation time can be shorter than or equal to a process safety time. The activation motion can be a small motion, which can be large enough to be detected by the motion sensor means 6. In accordance with an exemplary embodiment, the activation motion can be smaller than a work motion. In addition, the activation motion can verify that the motion sensor means 6 is functional.

In accordance with an exemplary embodiment, a magnitude of an activation motion can be chosen such that the activation motion can be safe to perform and does not interfere with a process in which the actuator assembly can be used. In an exemplary embodiment, the magnitude of an activation motion can be chosen to be the smallest motion detectable by the motion sensor means.

In accordance with an exemplary embodiment disclosed herein, the process safety time is the shortest period of time it can take for the monitored process to transition from the normal state to a state capable of causing a hazard. The normal state can be a state in which the risk the process causes can be sufficiently low for its intended application. For example, the process safety time can be the amount of time that can be available to transfer the actuator assembly into a safety state in case of a failure. The actuator assembly cannot change from safe to dangerous within the process safety time. The process safety time can vary from milliseconds to several minutes depending on an embodiment.

The safety means 10 can be adapted to provide the activation motion of the actuator 4 by controlling the activation means 12. The activation motion of the actuator 4 can be a reciprocating motion that starts and ends at a same position. Therefore, the actuator 4 can remain in a same position even after a plurality of activation motions. In an exemplary embodiment, in which there are no limitations for movements of the actuator, the activation motion can be unidirectional and can be carried out in a same direction every time.

In FIG. 1, the power means 2, the timing means 8, the safety means 10 and the activation means 12 are depicted as separate units. However, in an exemplary embodiment, the several units can be combined into larger units. For example, the activation means 12 can be incorporated in the power means 2 or in the safety means 10, or part of the functions of the activation means 12 can be incorporated in the power means 2 while rest of the functions of the activation means 12 can be incorporated in the safety means 10. In accordance with an exemplary embodiment, the timing means 8 can be incorporated in the safety means 10, and/or the timing means 8 can be incorporated in the activation means 12.

The safety means 10 can be adapted to control the power means 2 to provide an activation motion of the actuator 4 prior to controlling the actuator assembly to an operational state, wherein the safety means 10 can be adapted to control the actuator assembly to the operational state only if the motion sensor means 6 detects the activation motion. In accordance with an exemplary embodiment, if the motion sensor means 6 does not detect the activation motion generated by the power means 2, for example, the safety means 10 can conclude that there is a malfunction in the motion sensor means 6 in which case it is not safe to transfer to the operational state.

In accordance with an exemplary embodiment, the safety means can be adapted to indirectly control the power means to provide an activation motion. The safety means can inform the power means about an intention to transfer into an operational state, wherein the power means can perform an activation motion in response to the information relating to the intention.

In an exemplary embodiment, the safety means 8 can be adapted to allow transferring into an operational state only after proper functioning of motion sensor means has been verified, regardless of an immobility time of the actuator. In an exemplary embodiment, the safety means can be adapted to always provide an activation motion of the actuator prior to controlling the actuator assembly to the operational state, wherein the actuator assembly can be controlled to the operational state only if the motion sensor means 6 detects the activation motion. In an exemplary embodiment, in which the activation means 12 can be adapted to continuously monitor an immobility time of the actuator, the safety means 10 can use an activation motion before transition to an operational state only if the immobility time of the actuator exceeds a process safety time.

In an exemplary embodiment of FIG. 1, the power means 2 can be off in the safety state. Because the power means 2 can be unenergized, any motion of the actuator 4 can be prevented in the safety state. The safety means 10 can be adapted to provide an intermediate state for the actuator assembly in which only an activation motion of the actuator 4 can be allowed. The intermediate state can enable verifying proper functioning of motion sensor means 6 prior to transferring to an operational state.

In an exemplary embodiment, an actuator assembly can be started from the safety state by allowing an operational state of the actuator assembly for a limited time in order to verify proper functioning of motion sensor means by performing an activation motion. A continuous operational state can be allowed only after a proper functioning of motion sensor means has been verified. In accordance with an exemplary embodiment, the limited time can be only shorter than or equal to the process safety time.

In an exemplary embodiment, the safety means 10 can be adapted to allow an activation motion of the actuator in a safety state, which can require that the power means 2 is energized in the safety state.

If the actuator assembly is in the operational state when the immobility time of the actuator exceeds the predetermined process safety time, the safety means 10 can control the actuator assembly into the safety state. In an exemplary embodiment, the safety means 10 can control the actuator assembly into an intermediate state in which only an activation motion of the actuator 4 can be allowed.

In accordance with an exemplary embodiment, motion sensor units 61 and 62 can be independent from each other. The motion sensor means 6 can be a redundant motion sensor means. In an exemplary embodiment, the motion sensor means 6 can include only one motion sensor unit, or more than two motion sensor units.

In accordance with an exemplary embodiment, a mean time to failure (MTTF) for each one of the motion sensor units 61 and 62 can be $10^6$ hours, for example, million hours.

Thus, in accordance with an exemplary embodiment, the probability that both motion sensor units break down during ten hours can be approximately $10^{-10}$.

In accordance with an exemplary embodiment, when MTTF can be known for each motion sensor unit 61, 62, of the motion sensor means 6, one can calculate the upper limit of Safety Integrity Level (SIL) of the actuator assembly. In accordance with an exemplary embodiment, Safety Integrity Level can be improved by increasing a number of independent motion sensor units and/or choosing motion sensor units with higher MTTF. Thus, a desired Safety Integrity Level can be achieved by appropriate design of motion sensor means, provided that the other equipment and the development processes can be shown to be sufficient for the given SIL.

In accordance with an exemplary embodiment, the motion sensor units 61 and 62 can include high threshold logic encoders, or HTL encoders. In an exemplary embodiment, the motion sensor means 6 can include digital encoders or analog encoders.

In accordance with an exemplary embodiment, the power means 2 can include a frequency converter 14. In an exemplary embodiment, the power means can include a controllable direct-current supply or device capable of controllably powering an actuator. The actuator 4 can include a rotating electric machine, wherein the motion sensor means 6 can be adapted to monitor rotation of a shaft 41 of the rotating electric machine. In an exemplary embodiment, the actuator can include a linear motor, wherein the motion sensor means 6 can be adapted to monitor linear motion of the motor.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An actuator assembly, comprising:
   a power unit;
   an actuator powered by the power unit, the power unit being configured to provide a work motion of the actuator;
   a motion sensor configured to monitor motion of the actuator, the motion sensor including at least one motion sensor unit, the motion sensor being arranged to provide motion sensor signals in response to motion of the actuator;
   a timing unit for receiving the motion sensor signals and measuring an immobility time of the actuator based on the motion sensor signals, the immobility time of the actuator representing time lapsed after previous motion of the actuator;
   a safety unit for selectively placing the actuator assembly into an operational state in which the work motion of the actuator is allowed, and a safety state in which the work motion of the actuator is prevented, the safety unit being configured to monitor immobility time of the actuator and to prevent the operational state of the actuator assembly in case the immobility time of the actuator exceeds a predetermined process safety time; and
   an activation unit configured to monitor an immobility time of the actuator during an operational state of the actuator assembly, and to control the power unit to provide an activation motion of the actuator when the immobility time exceeds a predetermined activation time, the predetermined activation time being shorter than or equal to the predetermined process safety time, the activation motion being detectable by the motion sensor.

2. An actuator assembly according to claim 1, wherein the safety unit is arranged to prevent the operational state of the actuator assembly such that if the actuator assembly is in the operational state when an immobility time of the actuator exceeds the predetermined process safety time, the safety unit will place the actuator assembly into the safety state.

3. An actuator assembly according to claim 1, wherein the safety unit is configured to selectively place the actuator assembly into an intermediate state in which only activation motion of the actuator is allowed, the intermediate state enabling verification of proper functioning of the motion sensor prior to transferring to an operational state.

4. An actuator assembly according to claim 1, wherein the safety unit is configured to allow starting of the actuator assembly from an off state by allowing an operational state of the actuator assembly for a limited time in order to verify proper functioning of the motion sensor through an activation motion, the limited time being shorter than or equal to the predetermined process safety time.

5. An actuator assembly according to claim 1, wherein the safety unit is configured to control the power unit to provide an activation motion of the actuator prior to placing the actuator assembly in an operational state, wherein the safety unit is configured to place the actuator assembly in the operational state only if the motion sensor detects activation motion.

6. An actuator assembly according to claim 5, wherein the safety unit is configured to control the power unit to provide an activation motion of the actuator prior to placing the actuator assembly in the operational state only in case an immobility time of the actuator exceeds the predetermined process safety time.

7. An actuator assembly according to claim 5, wherein the safety unit is configured to provide the activation motion of the actuator by controlling the activation unit.

8. An actuator assembly according to claim 1, wherein the activation motion of the actuator is a reciprocating motion.

9. An actuator assembly according to claim 8, wherein the activation motion of the actuator is a reversible reciprocating motion that starts and ends at a same position.

10. An actuator assembly according to claim 1, wherein the motion sensor is a redundant motion sensor comprising:
    a plurality of motion sensor units which are independent from each other.

11. An actuator assembly according to claim 1, wherein the motion sensor comprises:
    a digital encoder.

12. An actuator assembly according to claim 11, wherein the motion sensor comprises:
    a high threshold logic encoder.

13. An actuator assembly according to claim 1, wherein the power unit comprises:
    a frequency converter.

14. An actuator assembly according to claim 1, wherein the motion sensor comprises:
    an analog encoder.

* * * * *